(12) United States Patent
Yano et al.

(10) Patent No.: US 11,548,960 B2
(45) Date of Patent: Jan. 10, 2023

(54) ETHYLENE/TETRAFLUOROETHYLENE COPOLYMER

(71) Applicant: DAIKIN INDUSTRIES, LTD., Osaka (JP)

(72) Inventors: Ryouichi Yano, Osaka (JP); Tatsuya Funaoka, Osaka (JP); Takahiro Kitahara, Osaka (JP); Takashi Sekiguchi, Osaka (JP); Kazunobu Uchida, Osaka (JP); Yuuko Takano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 166 days.

(21) Appl. No.: 16/762,764

(22) PCT Filed: Nov. 8, 2018

(86) PCT No.: PCT/JP2018/041538
§ 371 (c)(1),
(2) Date: May 8, 2020

(87) PCT Pub. No.: WO2019/093433
PCT Pub. Date: May 16, 2019

(65) Prior Publication Data
US 2020/0362077 A1    Nov. 19, 2020

(30) Foreign Application Priority Data

Nov. 10, 2017  (JP) .............................. JP2017-217773

(51) Int. Cl.
| | | |
|---|---|---|
| C08F 214/26 | (2006.01) | |
| C08F 210/02 | (2006.01) | |
| H01B 3/44 | (2006.01) | |
| C08J 5/18 | (2006.01) | |

(52) U.S. Cl.
CPC .......... *C08F 214/26* (2013.01); *C08F 210/02* (2013.01); *C08J 5/18* (2013.01); *H01B 3/44* (2013.01); *C08J 2323/08* (2013.01); *C08J 2327/18* (2013.01)

(58) Field of Classification Search
CPC combination set(s) only.
See application file for complete search history.

(56) References Cited

U.S. PATENT DOCUMENTS

| | | | |
|---|---|---|---|
| 4,513,129 A | 4/1985 | Nakagawa et al. | |
| 6,372,870 B1* | 4/2002 | Kitahara | ............... B32B 15/085 526/250 |
| 6,451,962 B1 | 9/2002 | Hiraga et al. | |
| 9,822,225 B2* | 11/2017 | Kouketsu | ............. B29C 48/142 |
| 2004/0030074 A1 | 2/2004 | Tsuda et al. | |
| 2007/0232754 A1* | 10/2007 | Aida | .................. C08L 23/0892 525/199 |
| 2009/0061280 A1 | 3/2009 | Ino et al. | |
| 2012/0037398 A1 | 2/2012 | Hirao et al. | |
| 2012/0111601 A1* | 5/2012 | Nakatani | ............... C09D 127/12 174/110 SR |
| 2013/0041109 A1* | 2/2013 | Iruya | ....................... B29C 48/04 525/197 |
| 2014/0135438 A1 | 5/2014 | Umino et al. | |
| 2016/0189986 A1* | 6/2016 | Kasai | .................... B32B 27/322 428/141 |
| 2017/0101529 A1* | 4/2017 | Terada | ..................... H01B 7/02 |

(Continued)

FOREIGN PATENT DOCUMENTS

| | | | |
|---|---|---|---|
| EP | 1 842 863 A1 | 10/2007 | |
| EP | 2 559 730 A1 | 2/2013 | |
| EP | 2 738 218 A1 | 6/2014 | |
| JP | 59-197411 A | 11/1984 | |
| JP | 01-115933 A | 5/1989 | |
| JP | 2000-198813 A | 7/2000 | |
| JP | 2002-194008 A | 7/2002 | |
| JP | 2011-213894 A | 10/2011 | |
| WO | 2007/089017 A1 | 8/2007 | |

(Continued)

OTHER PUBLICATIONS

Communication dated Jun. 30, 2021 by the European Patent Office in counterpart application No. 18876618.2.
International Search Report for PCT/JP2018/041538 dated Jan. 29, 2019 [PCT/ISA/210].
International Preliminary Report on Patentability with translation of Written Opinion dated May 12, 2020, in International Application No. PCT/JP2018/041538.

(Continued)

*Primary Examiner* — Nicole M. Buie-Hatcher
(74) *Attorney, Agent, or Firm* — Sughrue Mion, PLLC

(57) ABSTRACT

An ethylene/tetrafluoroethylene copolymer satisfying the following formula (1), wherein peak intensities, determined by Fourier transform infrared spectroscopy, of vibrations derived from a —$CF_2H$ group, a —$CF_2CH_2COF$ group, a —COF group, a —COOH group, a dimer of a —$CF_2COOH$ group and a monomer of a $CF_2CH_2COOH$ group, a —$COOCH_3$ group, a —$CONH_2$ group, and a —$CH_2OH$ group satisfy the following formula (2):

$$75 \leq \tan \delta(60)/\tan \delta(5) \times 100 \leq 225 \quad (1)$$

$$PI_A/(PI_B+PI_C+PI_D+PI_E+PI_F+PI_G+PI_H) \geq 0.60 \quad (2)$$

wherein tan δ(60), tan δ(5), $PI_A$, $PI_B$, $PI_C$, $PI_D$, $PI_E$, $PI_F$, $PI_G$ and $PI_H$ are as defined in the specification. Also disclosed is a molded article obtained by molding the ethylene/tetrafluoroethylene copolymer and an electric wire including a core and a coat formed from the ethylene/tetrafluoroethylene copolymer.

14 Claims, No Drawings

(56) References Cited

U.S. PATENT DOCUMENTS

2018/0186914 A1\* 7/2018 Taguchi .................. C08L 27/18
2018/0237566 A1    8/2018 Aida et al.

FOREIGN PATENT DOCUMENTS

| WO | 2010/123002 A1 | 10/2010 |
| WO | 2013/015202 A1 | 1/2013 |
| WO | 2017082315 A1 | 5/2017 |
| WO | 2017082417 A1 | 5/2017 |

\* cited by examiner

ETHYLENE/TETRAFLUOROETHYLENE COPOLYMER

CROSS REFERENCE TO RELATED APPLICATIONS

This application is a National Stage of International Application No. PCT/JP2018/041538 filed Nov. 8, 2018, claiming priority based on Japanese Patent Application No. 2017-217773 filed Nov. 10, 2017.

TECHNICAL FIELD

The invention relates to ethylene/tetrafluoroethylene copolymers.

BACKGROUND ART

Ethylene/tetrafluoroethylene copolymers (ETFE) have excellent properties such as heat resistance, weather resistance, electric insulation, and non-stickiness, and have better moldability and mechanical strength among fluororesins. Thus, ETFE is processed by a melt-molding technique into a wide variety of molded articles such as coated electric wires, tubes, sheets, and films, and is subjected to a variety of studies.

For example, Patent Literature 1 aims to produce a molded article excellent in heat resistance and stress-crack resistance with good productivity and discloses a fluorine-containing copolymer composition containing ETFE having a specific monomer composition ratio and a specific amount of copper oxide.

Patent Literature 2 aims to achieve excellent heat resistance and improved crack resistance at high temperatures and discloses an ethylene-tetrafluoroethylene copolymer containing a repeating unit derived from ethylene, a repeating unit derived from tetrafluoroethylene, and a repeating unit derived from a specific fluorovinyl compound.

Patent Literature 3 aims to provide a copolymer that generates no bubbles due to volatile components during molding and discloses a method for stabilizing a tetrafluoroethylene copolymer including bringing a tetrafluoroethylene copolymer produced by polymerization using peroxydicarbonate as a polymerization initiator into contact with ammonia or an ammonium salt of weak acid after the polymerization.

Patent Literature 4 discloses an ethylene/tetrafluoroethylene copolymer containing copolymerized units of ethylene, tetrafluoroethylene, and a fluorine-containing vinyl monomer represented by the following formula:

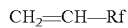

CH$_2$=CH—Rf (wherein Rf is a C4 or higher perfluoroalkyl group), wherein the fluorine-containing vinyl monomer is contained in an amount of 0.8 to 2.5 mol % of the sum of all monomers, and the copolymer has an ethylene/tetrafluoroethylene mole ratio of 33.0/67.0 to 44.0/56.0, a CH index of 1.40 or lower, a melting point of 230° C. or higher, and a melt flow rate of 40 (g/10 min) or lower.

CITATION LIST

Patent Literature

Patent Literature 1: WO 2013/015202
Patent Literature 2: JP S59-197411 A
Patent Literature 3: JP H01-115933 A
Patent Literature 4: WO 2010/123002 A

SUMMARY OF INVENTION

Technical Problem

The fluorine-containing copolymer composition disclosed in Patent Literature 1 has a disadvantage in dispersion uniformity of an acid acceptor such as copper oxide and a molded article obtained therefrom needs to be improved in quality stability of heat resistance and mechanical strength. The ethylene-tetrafluoroethylene copolymer disclosed in Patent Literature 2 cannot be prevented from gelation and pyrolysis in a molding machine during melt molding at high temperature, and thus has difficulty in providing a good molded article. The stabilization method disclosed in Patent Literature 3 needs to be improved because stain occurs at high temperature. The ethylene/tetrafluoroethylene copolymer disclosed in Patent Literature 4 needs to be improved in heat resistance, melt-fabricability, and mechanical properties.

In view of the above current state of the art, the invention aims to provide an ethylene/tetrafluoroethylene copolymer having excellent melt-fabricability and excellent heat resistance.

The invention also aims to provide an ethylene/tetrafluoroethylene copolymer excellent in both mechanical properties and melt-fabricability.

Solution to Problem

The inventors performed studies on solutions to the above issues and found that satisfying specific conditions on loss tangents and satisfying specific conditions on the intensity ratio of specific groups determined by Fourier transform infrared spectroscopy allow an ethylene/tetrafluoroethylene copolymer to have significantly excellent heat resistance and excellent melt moldability, completing the invention.

In other words, the invention relates to an ethylene/tetrafluoroethylene copolymer (hereinafter, also referred to as a "first ethylene/tetrafluoroethylene copolymer of the invention") satisfying the following formula (1),
wherein peak intensities, determined by Fourier transform infrared spectroscopy, of vibrations derived from a —CF$_2$H group, a —CF$_2$CH$_2$COF group, a —COF group, a —COOH group, a dimer of a —CF$_2$COOH group and a monomer of a CF$_2$CH$_2$COOH group, a —COOCH$_3$ group, a —CONH$_2$ group, and a —CH$_2$OH group satisfy the following formula (2), $$75 \leq \tan \delta(60)/\tan \delta(5) \times 100 \leq 225 \quad (1)$$

wherein
tan δ(5): a loss tangent after five minutes from start of measurement in dynamic mechanical analysis in an air atmosphere at 320° C.; and
tan δ(60): a loss tangent after 60 minutes from the start of measurement in the dynamic mechanical analysis in the air atmosphere at 320° C., $$PI_A/(PI_B+PI_C+PI_D+PI_E+PI_F+PI_G+PI_H) \geq 0.60 \quad (2)$$

wherein
$PI_A$: the peak intensity of vibration derived from the —CF$_2$H group;
$PI_B$: the peak intensity of vibration derived from the —CF$_2$CH$_2$COF group;
$PI_C$: the peak intensity of vibration derived from the —COF group;

PI$_D$: the peak intensity of vibration derived from the —COOH group;

PI$_E$: the peak intensity of vibration derived from the dimer of the —CF$_2$COOH group and the monomer of the CF$_2$CH$_2$COOH group;

PI$_F$: the peak intensity of vibration derived from the —COOCH$_3$ group;

PI$_G$: the peak intensity of vibration derived from the —CONH$_2$ group; and

PI$_H$: the peak intensity of vibration derived from the —CH$_2$OH group.

Preferably, the first ethylene/tetrafluoroethylene copolymer of the invention contains a polymerized unit (a) based on ethylene and a polymerized unit (b) based on tetrafluoroethylene, and the polymerized unit (a) based on ethylene and the polymerized unit (b) based on tetrafluoroethylene give a mol % ratio (a)/(b) of (50 to 10)/(50 to 90), more preferably (44 to 41)/(56 to 59), still more preferably (43.5 to 41.5)/(56.5 to 58.5).

The ethylene/tetrafluoroethylene copolymer of the invention also preferably contains a polymerized unit (a) based on ethylene, a polymerized unit (b) based on tetrafluoroethylene, and a polymerized unit (c) based on a monomer copolymerizable with ethylene and tetrafluoroethylene.

Preferably, the polymerized unit (c) is a polymerized unit based on a monomer represented by the following formula (A1):

$$CH_2=CXY \qquad (A1)$$

wherein X is a hydrogen atom or a fluorine atom; and Y is a fluoroalkyl group. More preferably, the monomer represented by the formula (A1) is a polymerized unit based on a monomer represented by the following formula (A2):

$$CH_2=CX-(CF_2)_nZ \qquad (A2)$$

wherein X and Z are the same as or different from each other and are each a hydrogen atom or a fluorine atom; and n is an integer of 2 to 8.

Preferably, the copolymer contains a structural unit derived from the monomer of the formula (A1) in an amount of 0.1 to 5.0 mol % of all structural units of the copolymer, more preferably 1.8 to 2.8 mol %, still more preferably 1.8 to 2.6 mol %, further more preferably 2.0 to 2.6 mol %.

In elemental analysis of the copolymer achieved by $^1$H-NMR analysis, the ethylene/tetrafluoroethylene copolymer of the invention preferably satisfies the following formula (3):

$$\text{(number of ethylene unit-ethylene unit bonds)/(total number of ethylene units each independently present between CF}_2\text{ groups)} \leq 0.060 \qquad (3).$$

The first ethylene/tetrafluoroethylene copolymer of the invention preferably has a melt flow rate of 0.1 to 60.0 g/10 min at 297° C., more preferably 4.0 to 45.0 g/10 min.

The inventors also found as a second invention that an ethylene/tetrafluoroethylene copolymer that has loss tangents satisfying specific conditions and that has a limited specific composition is excellent in both mechanical properties and melt-moldability, completing the invention.

The invention also relates to an ethylene/tetrafluoroethylene copolymer (hereinafter, also referred to as a "second ethylene/tetrafluoroethylene copolymer of the invention") that satisfies the following formula (1), containing a polymerized unit (a) based on ethylene, a polymerized unit (b) based on tetrafluoroethylene, and a polymerized unit (c) based on a monomer copolymerizable with ethylene and tetrafluoroethylene, the polymerized unit (a) based on ethylene and the polymerized unit (b) based on tetrafluoroethylene giving a mol % ratio (a)/(b) of (44 to 41)/(56 to 59), the polymerized unit (c) being present in an amount of 1.8 mol % or more of all structural units, $$75 \leq \tan \delta(60)/\tan \delta(5) \times 100 \leq 225 \qquad (1)$$

wherein tan $\delta$ (5): a loss tangent after five minutes from start of measurement in dynamic mechanical analysis in an air atmosphere at 320° C.

tan $\delta$(60): a loss tangent after 60 minutes from the start of measurement in the dynamic mechanical analysis in the air atmosphere at 320° C.

The polymerized unit (c) is preferably a polymerized unit based on a monomer represented by the following formula (A1):

$$CH_2=CXY \qquad (A1)$$

(wherein X is a hydrogen atom or a fluorine atom; and Y is a fluoroalkyl group), more preferably a polymerized unit based on a monomer represented by the following formula (A2):

$$CH_2=CX-(CF_2)_nZ \qquad (A2)$$

wherein X and Z are the same as or different from each other and are each a hydrogen atom or a fluorine atom; and n is an integer of 2 to 8.

In the second ethylene/tetrafluoroethylene copolymer of the invention, the mol % ratio (a)/(b) of the polymerized unit (a) based on ethylene and the polymerized unit (b) based on tetrafluoroethylene is still more preferably (43.5 to 41.5)/(56.5 to 58.5).

The invention also relates to a molded article obtainable by molding the first or second ethylene/tetrafluoroethylene copolymer of the invention. The molded article of the invention is preferably a film or a sheet.

The invention also relates to an electric wire including a core and a coat formed from the first or second ethylene/tetrafluoroethylene copolymer of the invention.

The phrase "the ethylene/tetrafluoroethylene copolymer (ETFE) of the invention" as used herein encompasses both the first ethylene/tetrafluoroethylene copolymer (ETFE) and the second ethylene/tetrafluoroethylene copolymer (ETFE) of the invention, unless otherwise mentioned.

Advantageous Effects of Invention

The first ethylene/tetrafluoroethylene copolymer of the invention has the aforementioned structure, and thus has excellent melt-fabricability and excellent heat resistance.

The second ethylene/tetrafluoroethylene copolymer of the invention has the aforementioned structure, and thus is excellent in both mechanical properties and melt-fabricability.

DESCRIPTION OF EMBODIMENTS

The invention will be specifically described hereinbelow.

The first ethylene/tetrafluoroethylene (hereinafter, also referred to as "TFE") copolymer (hereinafter, also referred to as "ETFE") of the invention satisfies the following formula (1):

$$75 \leq \tan \delta(60)/\tan \delta(5) \times 100 \leq 225 \qquad (1)$$

wherein tan δ(5): a loss tangent after five minutes from start of measurement in dynamic mechanical analysis in an air atmosphere at 320° C.; and tan δ(60): a loss tangent after 60 minutes from the start of measurement in the dynamic mechanical analysis in the air atmosphere at 320° C.

Polymer materials are viscoelastic materials and have both elastic and viscous properties. A known method for finding viscoelastic behaviors is dynamic mechanical analysis. The dynamic mechanical analysis provides detection of the amplitude ratio and phase difference of the stress and strain, from which the storage elastic modulus G' and loss elastic modulus G" are calculated. The value obtained by dividing G" by G' is the loss tangent tanδ. A lower loss tangent tan δ value can be considered as indicating a higher proportion of an elastic component, while a higher tan δ value can be considered as indicating a higher proportion of a viscous component. The above analytical technique enables observation of gelation (re-bonding) and degradation behaviors in a high-temperature environment.

The tan δ(60)/tan δ(5) means the loss tangent change ratio of the loss tangent after 60 minutes from the start of measurement to the loss tangent after 5 minutes from the start of measurement in the dynamic mechanical analysis at 320° C. in the air atmosphere.

Satisfying the formula (1) allows the ETFE of the invention with reduced gelation and pyrolysis in a high-temperature environment and thereby to be excellent in both melt-fabricability and heat resistance. The ETFE having a tan δ(60)/tan δ(5) ratio of lower than 75 contains a higher proportion of the elastic component. Thus, for example, the ETFE easily becomes gel in a molding machine and generates foreign substances during high-temperature molding and easily causes cone fracture (coating breakage) during formation of an electric wire. The ETFE having a tan δ(60)/tan δ(5) ratio of higher than 225 is preferentially pyrolyzed. Thus, the polymer is separated into low molecular weight components, resulting in low mechanical properties. Satisfying the above range of the formula (1) can reduce gelation (re-bonding) and degradation, which can lead to excellent melt-fabricability and excellent heat resistance and can reduce generation of foreign substances during high-temperature molding, while reducing a drop in mechanical properties due to degradation.

The tan δ(5) and the tan δ(60) are loss tangents tanδ measured after 5 and 60 minutes from the start of melting ETFE using a rotary rheometer provided with a heating chamber in the air atmosphere at a measurement temperature of 320° C. The conditions for the rotary rheometer are as follows: a diameter of each parallel disk of 25 mm, a measurement gap of 1.0 mm, a frequency of 1 rad/s, and a measurement strain of 3%.

The start of melting means the timing at which the ETFE is put into the heating chamber in the measurement temperature atmosphere.

The air atmosphere may be a normal air atmosphere (oxygen concentration: about 20% by volume), for example.

In the first ETFE of the invention, the peak intensities, determined by Fourier transform infrared spectroscopy, of vibrations derived from a —$CF_2H$ group, a —$CF_2CH_2COF$ group, a —COF group, a —COOH group, a dimer of a —$CF_2COOH$ group and a monomer of a $CF_2CH_2COOH$ group, a —$COOCH_3$ group, a —$CONH_2$ group, and a —$CH_2OH$ group preferably satisfy the following formula (2):

$$PI_A/(PI_B+PI_C+PI_D+PI_E+PI_F+PI_G++PI_H) \geq 0.60 \quad (2)$$

wherein $PI_A$: the peak intensity of vibration derived from the —$CF_2H$ group;

$PI_B$: the peak intensity of vibration derived from the —$CF_2CH_2COF$ group;

$PI_C$: the peak intensity of vibration derived from the —COF group;

$PI_D$: the peak intensity of vibration derived from the —COOH group;

$PI_E$: the peak intensity of vibration derived from the dimer of the —$CF_2COOH$ group and the monomer of the $CF_2CH_2COOH$ group;

$PI_F$: the peak intensity of vibration derived from the —$COOCH_3$ group;

$PI_G$: the peak intensity of vibration derived from the —$CONH_2$ group; and $PI_H$: the peak intensity of vibration derived from the —$CH_2OH$ group.

Each peak intensity can be determined using a Fourier transform infrared spectrophotometer (FT-IR) on a 200-μm-thick film formed by press molding the ETFE at 300° C. and 3.0 MPaG.

The peak of vibration derived from each end group is the peak of the following absorption frequency with the values within a range of 2950 to 3000 cm$^{-1}$ being standardized to 1.5 Å.

—$CF_2H$ group: 3010 cm$^{-1}$
—$CF_2CH_2COF$ group: 1846 cm$^{-1}$
—COF group: 1884 cm$^{-1}$
—COOH group: 1813 cm$^{-1}$
Dimer of —$CF_2COOH$ group and monomer of —$CF_2CH_2COOH$ group: 1760 cm$^{-1}$
—$COOCH_3$ group: 1795 cm$^{-1}$
—$CONH_2$ group: 3438 cm$^{-1}$
—$CH_2OH$ group: 3648 cm$^{-1}$
—$CH_2$- group: 2975 cm$^{-1}$ Satisfying that $PI_A/(PI_B+PI_C+PI_D+PI_E+PI_F+PI_G+PI_H)$ is 0.60 or higher in the formula (2) indicates that the proportion of the —$CF_2H$ group in the ETFE is high relative to the sum of the amounts of the —$CF_2CH_2COF$ group, the —COF group, the —COOH group, the —$CF_2COOH$ group, the —$COOCH_3$ group, the —$CONH_2$ group, and the —$CH_2OH$ group.

Quantitative analysis of the —$CF_2H$ group in the ETFE is difficult. Thus, in the invention, the formula (2) is used as an indicator for the amount of the —$CF_2H$ group in the ETFE.

Satisfying the formula (2) allows the ETFE of the invention to have excellent heat resistance and to reduce stain at high temperature.

The above groups can be introduced into the ethylene/tetrafluoroethylene copolymer by appropriate selection of a polymerization initiator used in polymerization or a polymerized unit (c) based on a monomer copolymerizable with ethylene and TFE to be described later.

The first ETFE of the invention can achieve reduced gelation and pyrolysis in a molding machine and thus can achieve excellent melt-fabricability as a result of synergism of satisfying the formulas (1) and (2). The first ETFE of the invention has excellent heat resistance, and thus can reduce stain at high temperature. Therefore, the first ETFE of the invention can suitably be used for applications requiring heat resistance.

The first ETFE of the invention can also reduce generation of foreign substances during high-temperature molding.

The ETFE satisfying the formulas (1) and (2) can be produced by adjusting the type of a polymerization initiator, the way of adding a chain transfer agent, the mol % ratio of the polymerized unit (a) based on ethylene and the polymerized unit (b) based on TFE, and the proportion of the polymerized unit (c) based on a monomer copolymerizable with ethylene and TFE.

For example, in the case of using a fluorine-containing polymerization initiator as a polymerization initiator, both the formulas (1) and (2) can be satisfied by adjusting the mol % ratio of the polymerized unit (a) and the polymerized unit (b) to (41 to 44)/(56 to 59) and feeding a chain transfer agent by continuous addition or split addition. In the absence of a fluorine-containing polymerization initiator as a polymerization initiator, both the formulas (1) and (2) can be satisfied by polymerization in which the mol % ratio of the polymerized unit (a) and the polymerized unit (b) is adjusted to (41 to 44)/(56 to 59), the proportion of the polymerized unit (c) is adjusted to 1.8 mol % or more, and a chain transfer agent is fed by continuous addition or split addition.

In order to achieve excellent heat resistance and excellent mechanical strength and to reduce generation of foreign substances during high-temperature molding, the first ETFE of the invention preferably contains the polymerized unit (a) based on ethylene and the polymerized unit (b) based on TFE at a mol % ratio (a)/(b) of (50 to 10)/(50 to 90). In order to achieve much better heat resistance, the mol % ratio (a)/(b) is more preferably (45 to 20)/(55 to 80), still more preferably (45 to 30)/(55 to 70), further more preferably (44 to 41)/(56 to 59), particularly preferably (43.5 to 41.5)/(56.5 to 58.5).

The first ETFE of the invention preferably contains the polymerized unit (a), the polymerized unit (b), and a polymerized unit (c) based on a monomer copolymerizable with ethylene and TFE.

The amounts of the polymerized unit (c) based on a monomer copolymerizable with ethylene and TFE is preferably 0 to 10.0 mol % relative to the sum of the polymerized unit (a) and the polymerized unit (b).

The second ETFE of the invention satisfies the following formula (1), contains a polymerized unit (a) based on ethylene, a polymerized unit (b) based on tetrafluoroethylene, and a polymerized unit (c) based on a monomer copolymerizable with ethylene and tetrafluoroethylene, contains the polymerized unit (a) based on ethylene and the polymerized unit (b) based on tetrafluoroethylene at a mol % ratio (a)/(b) of (44 to 41)/(56 to 59) and contains the polymerized unit (c) in an amount of 1.8 mol % or more relative to all structural units, $$75 \leq \tan \delta(60)/\tan \delta(5) \times 100 \leq 225 \quad (1)$$

wherein tan δ(5): loss tangent after five minutes from start of measurement in dynamic mechanical analysis in air atmosphere at 320° C.; and tan δ(60): loss tangent after 60 minutes from start of measurement in dynamic mechanical analysis in air atmosphere at 320° C.

The second ETFE of the invention satisfies the formula (1) and has a limited specific composition, and thus can achieve reduced gelation and pyrolysis in a molding machine, can achieve excellent melt-fabricability, and can have improved mechanical properties while maintaining the melt-fabricability. The second ETFE of the invention can also reduce generation of foreign substances during high-temperature molding.

With the above specific composition, the ETFE satisfying the formula (1) can be obtained by feeding a chain transfer agent by continuous addition or split addition in the polymerization.

In order to achieve much better heat resistance and mechanical strength and to reduce generation of foreign substances during high-temperature molding, the second ETFE of the invention more preferably contains the polymerized unit (a) based on ethylene and the polymerized unit (b) based on TFE at a mol % ratio (a)/(b) of (43.5 to 41.5)/(56.5 to 58.5).

In order to more improve the heat resistance and to more reduce generation of foreign substances during molding, the proportion of the polymerized unit (c) in the second ETFE of the invention is preferably 1.8 mol % or more, more preferably 1.9 mol % or more, particularly preferably 2.0 mol % or more, still more preferably 2.2 mol % or more, while preferably 8.0 mol % or less, more preferably 5.0 mol % or less, still more preferably 2.8 mol % or less, further more preferably 2.6 mol % or less, particularly preferably 2.5 mol % or less, relative to the sum of the polymerized unit (a) and the polymerized unit (b).

The ETFE of the invention preferably contains a —CF$_2$H group at a main chain end. The presence of a —CF$_2$H group at a main chain end and satisfying the formulas (1) and (2) can provide a copolymer having significantly excellent heat resistance.

The ETFE of the invention may contain an end group other than the —CF$_2$H group at a main chain end.

The ETFE of the invention contains a polymerized unit (a) based on ethylene and a polymerized unit (b) based on TFE.

The polymerized unit (a) based on ethylene represents a repeating unit represented by —CH$_2$CH$_2$—. The polymerized unit (b) based on TFE represents a repeating unit represented by —CF$_2$CF$_2$—.

In the ETFE of the invention, the monomer copolymerizable with ethylene and TFE may be any monomer that contains a terminal carbon-carbon double bond and that is copolymerizable with ethylene and TFE.

The polymerized unit (c) based on a monomer copolymerizable with ethylene and TFE represents a structure derived from the monomer of interest that is copolymerized into a polymer to serve as part of the polymer structure.

Examples of the monomer copolymerizable with ethylene and TFE include vinylidene fluoride, chlorotrifluoroethylene, vinyl fluoride, hexafluoropropylene, hexafluoroisobutene, perfluoro(alkyl vinyl ether) represented by CF$_2$=CF—ORf$^1$ (wherein Rf$^1$ is a C1-C8 perfluoroalkyl group), an alkyl perfluorovinyl ether derivative represented by CF$_2$=CF—OCH$_2$—Rf$^2$ (wherein Rf$^2$ is a C1-C45 perfluoroalkyl group), and (fluoroalkyl)ethylene represented by the formula (A1):

wherein X is a hydrogen atom or a fluorine atom; and Y is a fluoroalkyl group.

The monomer copolymerizable with ethylene and TFE is preferably (fluoroalkyl)ethylene represented by the formula (A1) among these.

In other words, in a preferred embodiment of the invention, the ETFE contains a polymerized unit (a) based on ethylene, a polymerized unit (b) based on TFE, and a polymerized unit based on a monomer represented by the following formula (A1):

wherein X is a hydrogen atom or a fluorine atom; and Y is a fluoroalkyl group.

The polymerized unit based on the monomer represented by the formula (A1) represents a repeating unit represented by —CH$_2$—CXY—.

Y in the formula (A1) is a fluoroalkyl group. The fluoroalkyl group may be either linear or branched. The fluoroalkyl group preferably has a carbon number of 2 to 10, more preferably 2 to 8, still more preferably 2 to 6.

The monomer represented by the formula (A1) is preferably a monomer represented by the following formula (A2):

$$CH_2=CX-(CF_2)_nZ \qquad (A2)$$

wherein X and Z are the same as or different from each other and are each a hydrogen atom or a fluorine atom; and n is an integer of 2 to 8.

In the formula (A2), n is an integer of 2 to 8, preferably an integer of 2 to 6, more preferably an integer of 2 to 4, still more preferably 3.

Examples of the monomer represented by the formula (A2) include CH$_2$=CF(CF$_2$)$_2$F, CH$_2$=CF(CF$_2$)$_3$F, CH$_2$=CF(CF$_2$)$_4$F, CH$_2$=CF(CF$_2$)$_2$H, CH$_2$=CF(CF$_2$)$_3$H, CH$_2$=CF(CF$_2$)$_4$H, CH$_2$=CH(CF$_2$)$_2$F, CH$_2$=CH(CF$_2$)$_3$F, CH$_2$=CH(CF$_2$)$_4$F, CH$_2$=CH(CF$_2$)$_6$F, CH$_2$=CH(CF$_2$)$_2$H, CH$_2$=CH(CF$_2$)$_3$H, and CH$_2$=CH(CF$_2$)$_4$H.

The monomer represented by the formula (A2) preferably includes at least one selected from the group consisting of CH$_2$=CF(CF$_2$)$_3$H, CH$_2$=CH(CF$_2$)$_3$F, CH$_2$=CF(CF$_2$)$_4$H, CH$_2$=CH(CF$_2$)$_4$F, CH$_2$=CF(CF$_2$)$_3$H, CH$_2$=CH(CF$_2$)$_3$F, CH$_2$=CF(CF$_2$)$_6$H, and CH$_2$=CH(CF$_2$)$_6$F, more preferably includes at least one selected from the group consisting of CH$_2$=CF(CF$_2$)$_3$H and CH$_2$=CH(CF$_2$)$_4$F, still more preferably is CH$_2$=CF(CF$_2$)$_3$H.

In order to achieve more improved heat resistance and to more reduce generation of foreign substances during high-temperature molding, the proportion of the polymerized unit based on a monomer represented by the formula (A1) or (A2) in the first ETFE of the invention is preferably 0 to 10.0 mol %, more preferably 0.1 to 8.0 mol %, still more preferably 0.1 to 5.0 mol %, further more preferably 0.5 to 5.0 mol %, particularly preferably 1.8 to 3.0 mol %, more particularly preferably 1.8 to 2.8 mol %, still more particularly preferably 1.8 to 2.6 mol %, further more particularly preferably 2.0 to 2.6 mol %, relative to the sum of the polymerized unit (a) and the polymerized unit (b).

In order to achieve much better melt-fabricability and heat resistance and to more reduce generation of foreign substances during high-temperature molding, the ETFE of the invention preferably satisfies 80 tan δ(60)/tan δ(5)×100≤200, more preferably 80≤tan δ(60)/tan δ(5)×100≤190, still more preferably 90≤tan δ(60)/tan δ(5)×100≤180, further more preferably 100≤tan δ(60)/tan δ(5)×100≤160.

The ETFE of the invention preferably further satisfies, in elemental analysis of the copolymer by $^1$H-NMR, the following formula (3):

(number of ethylene unit-ethylene unit bonds)/(total number of ethylene units each independently present between CF$_2$ groups)≤0.060   (3).

The formula (3) indicates that the ratio of the number of bonds of ethylene units to the ethylene units each independently present between CF$_2$ groups in the ETFE is lower. The ETFE in which the number of ethylene unit bonds gives a ratio that is not higher than the specific value can have reduced gelation and pyrolysis in a high-temperature environment and excellent melt-fabricability and heat resistance.

Satisfying the formulas (1) and (2) and satisfying the formula (3) enable more reduced generation of foreign substances during high-temperature molding and more improved heat resistance.

The number of ethylene unit-ethylene unit bonds and the total number of ethylene units each independently present between CF$_2$ groups can be determined by $^1$H-NMR analysis.

The formula (3) is influenced by the polymerization temperature. Polymerization at a lower temperature can provide a smaller value of (number of ethylene unit-ethylene unit bonds)/(total number of ethylene units each independently present between CF$_2$ groups). The polymerization temperature is preferably 10° C. to 80° C., more preferably 15° C. to 50° C., still more preferably 25° C. to 40° C.

The ETFE of the invention preferably further satisfies the following formula (4).

$$\text{MIT value} \geq -28000 \times \log(\text{MFR}) + 128000 \qquad (4)$$

wherein

MIT value: bending endurance (number of bendings) measured in conformity with ASTM D-2176; and MFR: melt flow rate measured at 297° C.

The MIT value is determined as follows. A film having a thickness of 0.20 to 0.23 mm is prepared by press molding at 300° C. and 3.0 MPaG and a rectangular sample having a width of 1.3 cm and a length of 90 mm is cut out of the film. This sample is mounted on an MIT bending fatigue resistance tester (available from Yasuda Seiki Seisakusho Ltd.) and the number of bendings until breakage of the sample is determined in conformity with ASTM D-2176.

The MFR is the mass (g/10 min) of a polymer that flows out of a nozzle having an inner diameter of 2 mm and a length of 8 mm per 10 minutes at 297° C. and under a load of 5 kg using a melt indexer (available from Toyo Seiki Seisaku-sho, Ltd.) in conformity with ASTM D3307-01.

The MFR and the MIT value are in a trade-off relationship. As the MFR decreases, the molecular weight increases and the MIT value also increases. In other words, when the mechanical properties are improved while the melt-fabricability is maintained, the MIT value is higher for the same MFR value. The higher the value of "−28000×log(MFR)+128000" is, the better the mechanical properties are for the same MFR value.

The ETFE of the invention satisfying the formula (4) can have much better mechanical strength, and thus can be particularly suitable for applications such as electric wires and tubes.

The formula (4) can be satisfied when the ethylene/tetrafluoroethylene copolymer contains the polymerized unit (a) based on ethylene and the polymerized unit (b) based on tetrafluoroethylene at a mol % ratio (a)/(b) of (44 to 41)/(56 to 59) (preferably, mol % ratio (a)/(b) of (43.5 to 41.5)/(56.5 to 58.5)) and when the structural unit derived from the monomer of the formula (A2) is present in an amount of 1.8 to 3.0 mol % (preferably 1.8 to 2.8 mol %, more preferably 1.8 to 2.6 mol %, still more preferably 2.0 to 2.6 mol %) relative to all structural units of the copolymer.

The ETFE of the invention more preferably satisfies MIT≥−28000×log(MFR)+128000, still more preferably satisfies MIT≥−28000×log(MFR)+129000, particularly preferably satisfies MIT≥−28000×log(MFR)+130000.

In the description, the amounts of the monomer units are values determined by $^{19}$F-NMR analysis.

The ETFE of the invention preferably has a melting point of 200° C. or higher. The ETFE having too low a melting point may deform when used at high temperature and thus has poor heat resistance. The melting point is more preferably higher than 200° C., still more preferably 220° C. or higher, particularly preferably 230° C. or higher. The melting point is also preferably 245° C. or higher. The upper limit of the melting point may be, but is not limited to, 280° C.

The melting point is the temperature at the peak on an endothermic curve obtained by thermal analysis at a temperature-increasing rate of 10° C./min using a differential scanning calorimeter in conformity with ASTM D-4591.

The ETFE of the invention preferably has a melt flow rate (MFR) at 297° C. of 0.1 to 60.0 g/10 min, more preferably 50.0 g/10 min or lower, still more preferably 45.0 g/10 min or lower, while more preferably 3.0 g/10 min or higher, still more preferably 4.0 g/10 min or higher.

The MFR is the mass (g/10 min) of a polymer that flows out of a nozzle having an inner diameter of 2 mm and a length of 8 mm per 10 minutes at 297° C. and under a load of 5 kg using a melt indexer (available from Toyo Seiki Seisaku-sho, Ltd.) in conformity with ASTM D3307-01.

The ETFE of the invention preferably has an initial pyrolysis temperature of 370° C. or higher. In terms of the heat resistance, the initial pyrolysis temperature is more preferably 375° C. or higher, still more preferably 380° C. or higher.

The initial pyrolysis temperature is the temperature at which the mass of a fluoropolymer decreases by 1% by mass when the fluoropolymer is heated at a rate of 10° C./min in the air atmosphere using a thermogravimetric-differential thermal analyzer.

A 1.5-mm-thick film of the ETFE of the invention prepared by press molding at 300° C. and 3.0 MPaG preferably has a pre-heat yellowness index of −40 or lower and a degree of yellowness index change before and after heating of 100 or lower. The heating is performed at 232° C. for 168 hours. The degree of change is more preferably 70 or lower.

The yellowness index is determined in conformity with ASTM-D1925.

The heating is performed at 232° C. for 168 hours using an electric furnace.

In a preferred embodiment of the first ETFE of the invention, the ETFE satisfies the formulas (1) and (2) and contains a polymerized unit (a), a polymerized unit (b) based on TFE, and a polymerized unit based on a monomer represented by the formula (A2), the polymerized unit (a) and the polymerized unit (b) give a mol % ratio (a)/(b) of (44 to 41)/(56 to 59) (more preferably, (43.5 to 41.5)/(56.5 to 58.5)), and the proportion of the polymerized unit based on the monomer represented by the formula (A2) is 0.1 to 8.0 mol % (more preferably, 1.8 to 2.5 mol %) relative to the sum of the polymerized unit (a) and the polymerized unit (b). In such an embodiment, the ETFE can be significantly excellent in melt-fabricability and heat resistance. The ETFE can also more reduce generation of foreign substances during high-temperature molding. The ETFE more preferably further satisfies the formula (3).

In a preferred embodiment of the second ETFE of the invention, the ETFE satisfies the formula (1) and contains a polymerized unit (a), a polymerized unit (b) based on TFE, and a polymerized unit based on a monomer represented by the formula (A2), the polymerized unit (a) and the polymerized unit (b) give a mol % ratio (a)/(b) of (44 to 41)/(56 to 59) (more preferably, (43.5 to 41.5)/(56.5 to 58.5)), and the proportion of the polymerized unit based on the monomer represented by the formula (A2) is 1.8 to 2.8 mol % relative to the sum of the polymerized unit (a) and the polymerized unit (b). In such an embodiment, the ETFE can be significantly excellent in melt-fabricability, mechanical properties, and heat resistance. The ETFE can also more reduce generation of foreign substances during molding. The ETFE more preferably further satisfies the formula (3).

The ETFE of the invention can be produced by polymerizing ethylene and TFE, optionally with a monomer copolymerizable with ethylene and TFE, using a polymerization initiator, preferably a fluorine-containing polymerization initiator, for example.

Examples of the polymerization include suspension polymerization, solution polymerization, emulsion polymerization, and bulk polymerization. Particularly preferred is suspension polymerization in an aqueous medium using a solvent, a polymerization initiator, and a chain transfer agent. The aqueous medium is preferably water.

In the suspension polymerization, a fluorosolvent is preferably used in addition to the aqueous medium.

Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFCl\ CFClCF_3$; hydrofluoroalkanes such as $CF_3CFHCFHCF_2CF_2CF_3$, $CF_2HCF_2CF_2CF_2CF_2H$, and $CF_3CF_2CF_2CF_2CF_2CF_2H$; hydrofluoroethers such as $CH_3O\ C_2F_5$, $CH_3OC_3F_7CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$, and $CF_3CHFCF_2OCH_2CF_3$; and perfluoroalkanes such as perfluorocyclobutane, $CF_3CF_2CF_2CF_3$, $CF_3CF_2CF_2CF_3$, and $CF_3CF_2CF_2CF_2CF_2CF_3$. Preferred among these are perfluoroalkanes. One of these fluorine-containing solvents may be used or two or more thereof may be used.

In terms of suspendability and economic efficiency, the fluorosolvent is preferably used in an amount of 10 to 100% by mass relative to the aqueous medium.

The polymerization initiator and the fluorine-containing polymerization initiator each may be any one, and may be a conventionally known one.

Examples of the polymerization initiator include oil-soluble radical polymerization initiators typified by a peroxy carbonate, and water-soluble radical polymerization initiators such as ammonium salts, potassium salts, and sodium salts of any of persulfuric acid, perboric acid, perchloric acid, perphosphoric acid, and percarbonic acid. Preferred among these are oil-soluble radical polymerization initiators, more preferred is a peroxydicarbonate. An example of the peroxydicarbonate is a peroxydicarbonate represented by the following formula:

wherein Rs are the same as or different from each other and are each a C3—C4 alkyl group or an alkoxyalkyl group.

Examples of the peroxydicarbonate represented by the above formula include diisopropyl peroxydicarbonate (IPP), di-n-propyl peroxydicarbonate (NPP), di-sec-butyl peroxydicarbonate (SBP), and di-2-ethoxyethyl peroxydicarbonate.

The peroxydicarbonate may be diluted in methanol, an aliphatic hydrocarbon solvent, or a fluorosolvent such as trichlorofluoroethane before use.

The fluorine-containing polymerization initiator may preferably be a peroxide represented by the following formula:

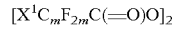

(wherein $X^1$s are the same as or different from each other and are each a hydrogen atom, a fluorine atom, or a chlorine atom; and m is an integer of 2 to 8). Specific examples thereof include di-perfluoropropionyl peroxide, di(ω-hydroperfluorohexanoyl)peroxide (DHP), and di(ω-chloroperfluoropropionyl)peroxide.

Also preferred are peroxides represented by the following formula:

[Cl(CF₂CFCl)₁CF₂C(=O)O]₂ such as di(trichloroperfluorohexanoyl)peroxide.

The polymerization initiator may be added at once at the start of polymerization. Still, the polymerization initiator is preferably fed by continuous addition or split addition from the start of polymerization to the end of polymerization.

The continuous addition means continuously adding the polymerization initiator from the start of polymerization to the end of polymerization without interruption. The split addition means successively adding the polymerization initiator in multiple portions from the start of polymerization to the end of polymerization.

The amount of the polymerization initiator added may be determined as appropriate in accordance with the intended use of the resulting ETFE. For example, the total amount of the polymerization initiator added is preferably 0.01 to 20 parts by mass, more preferably 0.01 to 10 parts by mass, still more preferably 0.02 to 8 parts by mass, relative to 100 parts by mass of the resulting polymer.

In the polymerization, a chain transfer agent is preferably used. The chain transfer agent used may be a conventionally known chain transfer agent. Preferred examples thereof include hydrocarbons such as ethane, isopentane, n-hexane, and cyclohexane; aromatic compounds such as toluene and xylene; ketones such as acetone; acetates such as ethyl acetate and butyl acetate; alcohols such as methanol and ethanol; mercaptan compounds such as methyl mercaptan; and halogenated hydrocarbons such as carbon tetrachloride, chloroform, methylene chloride, and methyl chloride. In other words, the chain transfer agent preferably includes at least one selected from the group consisting of hydrocarbons, aromatic compounds, ketones, alcohols, mercaptan compounds, and halogenated hydrocarbons. One of these chain transfer agents may be used, or a plurality thereof may be used in combination.

In the polymerization, the chain transfer agent may be added at once at the start of polymerization. Still, the chain transfer agent is preferably fed by continuous addition or split addition from the start of polymerization to the end of polymerization.

The amount of the chain transfer agent added may vary in accordance with the chain transfer constant of the compound used as the chain transfer agent and may be determined as appropriate in accordance with the intended use of the resulting ETFE. For example, the total amount of the chain transfer agent added is preferably 0.005 to 20% by mass, more preferably 0.01 to 10% by mass, still more preferably 0.01 to 8% by mass, relative to the polymerization solvent.

The polymerization temperature in the polymerization may be, but is not limited to, 0° C. to 100° C., for example. The polymerization pressure may be determined as appropriate in accordance with other polymerization conditions such as the type, amount, and vapor pressure of a solvent used and the polymerization temperature, and is usually 0 to 9.8 MPa.

In the polymerization, preferably, a polymerization initiator is used and the following formula (5) is satisfied. Satisfying these conditions enables production of ETFE excellent in both melt-fabricability and heat resistance. Satisfying these conditions also enables production of ETFE that causes much less generation of foreign substances during high-temperature molding.

$$\log_{10}(Mh/Mf) \leq 1.0 \quad (5)$$

Mh: melt flow rate after one hour from addition of the polymerization initiator

Mf: melt flow rate of the ethylene-tetrafluoroethylene copolymer obtained by polymerization Mh is the melt flow rate after one hour from addition of the polymerization initiator. Mh may be a value obtained by the aforementioned method for determining the MFR on, for example, ETFE powder obtained by collecting 6 g of ETFE under polymerization after one hour from addition of the polymerization initiator, and washing and drying the polymer.

Mf is the melt flow rate of the ethylene-tetrafluoroethylene copolymer obtained by the polymerization and is the aforementioned melt flow rate at 297° C.

In other words, preferably, the ETFE of the invention is obtainable by polymerizing ethylene and TFE with the use of a polymerization initiator and the polymerization satisfies the formula (5). In usual cases, the melt flow rate decreases as the polymerization progresses. Thus, when the melt flow rate after one hour from addition of the polymerization initiator, i.e., the value at an early stage where the melt flow rate is high, and the value of the ethylene-tetrafluoroethylene copolymer after completion of the polymerization where the melt flow rate is low give a ratio satisfying the formula (5), the ETFE produced can be excellent in both melt-fabricability and heat resistance. Further, the ETFE produced can more reduce generation of foreign substances during high-temperature molding.

The polymerization preferably satisfies $\log_{10}(Mh/Mf) \leq 0.9$, more preferably satisfies $\log_{10}(Mh/Mf)$ 0.8, still more preferably satisfies $\log_{10}(Mh/Mf)$ 0.7, further more preferably satisfies $\log_{10}(Mh/Mf) \leq 0.6$, particularly preferably satisfies $\log_{10}(Mh/Mf) \leq 0.5$.

An exemplary method for satisfying the formula (5) is a method in which the polymerization initiator and the chain transfer agent are fed by continuous addition or split addition, as described above.

The ETFE of the invention is excellent in both melt-fabricability and heat resistance and can more reduce generation of foreign substances during high-temperature molding, and thus can be applied to a wide variety of molded articles. The invention also relates to a molded article obtainable by molding the ETFE of the invention.

The molded article of the invention may be obtained by any molding method, such as a conventionally known molding method, e.g., injection molding, extrusion molding, blow molding, press molding, rotational molding, or electrostatic coating. The ETFE of the invention is excellent in melt-fabricability and heat resistance, and thus is particularly more suitable for a molded article obtainable by injection molding or extrusion molding.

The molded article of the invention may have any of a variety of shapes, such as a sheet shape, a film shape, a rod shape, a pipe shape, or a fibrous shape.

The molded article may be used for any applications, such as a variety of films or sheets, bags, electric wire coats, tableware such as beverage containers, cables, pipes, fibers, bottles, gasoline tanks, and various other industrial molded articles. Preferred among these is a film or sheet.

The film or sheet is preferably a back sheet for a solar cell, an aircraft release film, a semiconductor release film, and a highly weather-resistant sheet, for example.

The molded article of the invention is suitable as an electric wire coat. Examples of the electric wire coat include electric wire coats used in electric devices such as robots, electric motors, power generators, and transformers, electric wire coats used in communication devices such as telephones, radio sets, computers, and data communication devices, and electric wire coats used in train vehicles, automobiles, aircraft, and ships. The molded article can be used for applications requiring heat resistance, and is particularly suitable for electric wire coats used in the electric devices such as robots, electric motors, power generators, and transformers.

The invention also relates to an electric wire including a core and a coat containing the ETFE of the invention. The electric wire of the invention including the coat enables appropriate selection of the diameter of the conductor and the thickness of the ETFE coat. For example, the electric wire can be used as a heat-resistant electric wire having an ETFE coat thickness of 5 to 500 μm. Further, the coat has excellent heat resistance, and thus can meet the UL1581 reference standard for flame retardance at 150° C. and 200° C. or can meet the Class E of the standards for automotive cables LV-112.

The coat may contain a different component to the extent that the effects of the invention are not impaired. Examples of the different component include a different resin and an additive. Examples of the different resin include an ETFE copolymer other than the ETFE of the invention and a melt-fabricable fluororesin other than the ETFE copolymer. Examples of the additive include a thermal stabilizer, a pigment, an ultraviolet absorber, a filler, a cross-linking agent, a cross-linking aid, and an organic peroxide.

Examples of the material of the core include copper, copper alloy, aluminum, and aluminum alloy. Preferred is copper. The core may be plated with tin, silver, or the like. The core preferably has a cross-sectional area of 0.01 to 200 mm$^2$, more preferably 0.05 to 100 mm$^2$, still more preferably 0.1 to 50 mm$^2$. The core having a cross-sectional area that is not smaller than the lower limit of the range is preferred because it can transmit a sufficient capacity of signals or electric power. The core having a cross-sectional area that is not greater than the upper limit of the range is preferred because it has excellent flexibility.

The coat preferably has a thickness of 1 to 5000 μm, more preferably 5 to 1000 μm, still more preferably 5 to 500 μm. The coat having a thickness that is not smaller than the lower limit of the range can have sufficient electric insulation and mechanical strength. The coat having a thickness that is not greater than the upper limit of the range allows a reduced amount of the material of the coat, reducing the cost of the electric wire. Further, such a coat allows the electric wire not to be heavy, so that the electric wire can be suitable as an electric wire for aircraft, an electric wire for automobiles, or an electric wire for robots for which a weight reduction is desired.

The electric wire of the invention can be produced by melting the ETFE of the invention and extruding the molten ETFE through an outlet of a die to surround the core, thereby forming a coat around the core. A device used in production of the electric wire may be an extruder provided with a cross head die for an electric wire.

Examples of the electric wire of the invention include a cable and a wire. Specific examples thereof include a coaxial cable, a high frequency cable, a flat cable, and a heat-resistant cable.

EXAMPLES

The invention is described hereinbelow with reference to examples. Still, the invention is not intended to be limited by these examples.

The parameters in the examples were determined by the following methods.
(Composition)

A nuclear magnetic resonance device AC300 (available from Bruker-Biospin) was used to perform $^{19}$F-NMR analysis with the measurement temperature set to the melting point of the polymer +20° C., and the composition was determined as the integral of the peaks.
(Melting Point)

A differential scanning calorimeter RDC220 (available from Seiko Instruments Inc.) was used to perform thermal analysis at a temperature-increasing rate of 10° C./min in conformity with ASTM D-4591. Based on the peak of the resulting endothermic curve, the melting point was determined.
(MFR)

The MFR was defined as the mass (g/10 min) of a polymer that flowed out of a nozzle having an inner diameter of 2 mm and a length of 8 mm per 10 minutes at 297° C. and under a load of 5 kg using a melt indexer (available from Toyo Seiki Seisaku-sho, Ltd.) in conformity with ASTM D3307-01.
(Initial Pyrolysis Temperature)

The initial pyrolysis temperature was defined as the temperature at which the mass of a fluoropolymer decreased by 1% by mass when the fluoropolymer was heated at a rate of 10° C./min in the air atmosphere using a thermogravimetric-differential thermal analyzer TG/DTA6200 or TG/DTA7200 (available from Hitachi High-Tech Science Corp.).
(Tan δ)

The loss tangents tan δ were measured after 5 and 60 minutes from the start of melting ETFE using a rotary rheometer (MCR302, available from Anton Peer GmbH) provided with a heating chamber in the air atmosphere at a measurement temperature of 320° C. These loss tangents were respectively taken as tan δ(5) and tan δ(60). The conditions were as follows: a diameter of each parallel disk of 25 mm, a measurement gap of 1.0 mm, a frequency of 1 rad/s, and a measurement strain of 3%. The start of melting was defined as the timing at which the resin was put into the heating chamber in the measurement temperature atmosphere.

The loss tangents satisfying 75≤tan δ(60)/tan δ(5)×100≤225 can be considered as giving good melt-fabricability.
(Volatile Content)

An electric furnace was used to determine the volatile content (wt %) in the following procedure.

An aluminum cup (the weight is defined as A) was preheated at 330° C. for one hour and a sample was precisely weighed within a range of 10±0.1 g using a precision scale (measurable to 0.1 mg) (the whole weight is defined as B).

Two pieces were prepared for one measurement sample. A standard sample with a known volatile content was weighed simultaneously, which was used as a reference. These pieces were put into the electric furnace whose temperature was controlled to 330° C. After one hour from the feeding of the pieces, the inside of the electric furnace was cooled down to 150° C. and the pieces were taken out thereof. Each sample was precisely weighed (this weight is defined as C).

The weight loss of the sample after one-hour heating at 330° C. was calculated by the following formula, which was taken as the volatile content (wt %).

Volatile content (wt %)=[(B−C)/(B−A)]×100

(Stain)

A 1.5-mm-thick film produced by press molding at 300° C. and 3.0 MPaG was heated at 232° C. for 168 hours. The yellowness index was determined before and after the heating using a colorimeter ZE6000 (available from Nippon Denshoku Industries Co., Ltd.) in conformity with the standard ASTM-D1925.

The film was also baked in an electric furnace at 330° C. for one hour, and the stain was visually observed. The criteria for the evaluation in the table are as follows.

Good: no stain (white)
Acceptable: slight stain (pale yellow)
Poor: stain (brown, dark brown)

(Analysis of End Groups)

The ETFE obtained in each of the examples and the comparative examples were press-molded at 300° C. and 3.0 MPaG into a film having a thickness of 200 μm, and this film was observed using a Fourier transform infrared spectrophotometer (FT-IR).

The peak of vibration derived from each end group is the peak of the following absorption frequency with the values within a range of 2950 to 3000 cm$^{-1}$ being standardized to 1.5 Å.

—$CF_2H$ group: 3010 cm$^{-1}$
—$CF_2CH_2COF$ group: 1846 cm$^{-1}$
—COF group: 1884 cm$^{-1}$
—COOH group: 1813 cm$^{-1}$
Dimer of —$CF_2COOH$ group and monomer of —$CF_2CH_2COOH$ group: 1760 cm$^{-1}$
—$COOCH_3$ group: 1795 cm$^{-1}$
—$CONH_2$ group: 3438 cm$^{-1}$
—$CH_2OH$ group: 3648 cm$^{-1}$
—$CH_2$- group: 2975 cm$^{-1}$ Based on the FT-IR measurement results, β was determined by the following formula.

$$\beta = PI_A/(PI_B+PI_C+PI_D+PI_E+PI_F+PI_G+PI_H)$$

$PI_A$: the peak intensity of vibration derived from the —$CF_2H$ group
$PI_B$: the peak intensity of vibration derived from the —$CF_2CH_2COF$ group
$PI_C$: the peak intensity of vibration derived from the —COF group
$PI_D$: the peak intensity of vibration derived from the —COOH group
$PI_E$: the peak intensity of vibration derived from the dimer of the —$CF_2COOH$ group and the monomer of the $CF_2CH_2COOH$ group
$PI_F$: the peak intensity of vibration derived from the —$COOCH_3$ group
$PI_G$: the peak intensity of vibration derived from the —$CONH_2$ group
$PI_H$: the peak intensity of vibration derived from the —$CH_2OH$ group (Evaluation of Thermal Crack Resistance)

The ETFE was applied through a ϕ20 extruder to cover a 200-μm core (copper wire) such that the coating layer had a thickness of 100 μm. The conditions were as follows.

molding temperature: 330° C.
draw-down ratio (DDR): 113
take-up speed: 50 m/min

The electric wire covered with ETFE as described above was heat-aged at 232° C. for 168 hours in conformity with UL1581, and the tensile elongation and the tensile strength at break before and after the heat aging were evaluated.

The tensile test on the coating layer of the covered electric wire formed by the above method was performed using a desktop precision universal tester AGS-X (available from Shimadzu Corp.).

Those satisfying the 200° C. heat-resistant test in conformity with UL1581 were evaluated as Good, while those not satisfying the test were evaluated as Poor.

(Evaluation of Foreign Substances in Electric Wire Coating)

The ETFE was applied at a molding temperature of 350° C., a draw-down ratio (DDR) of 142, and a take-up speed of 50 m/min through a ϕ20 extruder to cover a 300-μm core (copper wire) such that the coating layer had a thickness of 80 μm. The product was evaluated under the conditions where foreign substances of 20 μm or greater were checked using a surface variation detector (available from Takikawa Engineering Co., Ltd.).

The following criteria were used for Good, Acceptable, and Poor in Table 5.

Good: within 0 to 5 foreign substances
Acceptable: within 6 to 20 foreign substances
Poor: not less than 21 foreign substances
*Criteria for evaluation of foreign substances (not smaller than 20 μm, number of foreign substances per 1000 m)

(MIT Test)

A film having a thickness of 0.20 to 0.23 mm was prepared by press molding at 300° C. and 3.0 MPaG and a rectangular sample having a width of 1.3 cm and a length of 90 mm was cut out of the film. This sample was mounted on an MIT bending fatigue resistance tester (available from Yasuda Seiki Seisakusho Ltd.) and subjected to a repeated bending test under the conditions in conformity with ASTM D-2176 (load: 1.25 kg, bending angle: 135 degrees, 175 times/min). The number of bendings until breakage of the sample was determined.

For the item "MIT (parameter)" in Tables 1 to 3, those in which MIT satisfied the following formula (4) were evaluated as Good, while those in which MIT did not satisfy the formula (4) were evaluated as Poor.

MIT=−28000×log(MFR)+128000  (4)

((Number of Ethylene Unit-Ethylene Unit Bonds)/(Total Number of Ethylene Units Each Independently Present Between $CF_2$ Groups))

In the elemental analysis of the copolymer by $^1$H-NMR, the ratio (number of ethylene unit-ethylene unit bonds)/(total number of ethylene units each independently present between $CF_2$ groups) was calculated.

Specifically, the $^1$H-NMR was performed on a solution containing the copolymer (Cl—$(CF_2CFCl)_3$—Cl) by $^1$H-NMR and the peak of the solution (Cl—$(CF_2CFCl)_3$—Cl) alone was subtracted from the resulting data to provide a chart. Based on the resulting chart, the values were calculated by the following formulas.

Number of ethylene unit-ethylene unit bonds: integral value within a range of 1.0 ppm to 2.0 ppm
Number of ethylene units between $CF_2$ groups: integral value within a range of 2.0 ppm to 3.7 ppm Example 1

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of octafluorocyclobutane (hereinafter, referred to as "C318"), 303 g of TFE, 8.8 g of ethylene, 6.75 g of perfluoro(1,1,5-trihydro-1-pentene), and 2 g of cyclohexane. The autoclave was then warmed up to 28° C. Next, 15.7 g of an 8% solution of di(ω-hydroperfluorohexanoyl)peroxide (hereinafter, abbreviated as "DHP") in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=57.0/43.0 mol % was continuously fed so as to maintain the pressure inside the system at 1.2 MPaG. Also, perfluoro(1,1,5-trihydro-1-pentene) in a total amount of 23.7 g was also continuously fed so as to continue the polymerization. After one and a half hours, after three hours, and after four and a half hours from the start of the polymerization, 7.8 g of an 8% solution of DHP in perfluorohexane was additionally fed. After every one and a half hours therefrom, 3.9 g of the solution was additionally fed. After every one and a half hours from the start of the polymerization, 1.5 g of cyclohexane was additionally fed three times. After 10 and a half hours from the start of the polymerization, the pressure was released to the atmospheric pressure. The reaction product was washed with water and dried, whereby 252 g of a fluororesin powder having an MFR of 45.7 g/10 min was obtained.

Example 2

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of C318, 303 g of TFE, 8.8 g of ethylene, 6.75 g of perfluoro(1,1,5-trihydro-1-pentene), and 3 g of cyclohexane. The autoclave was then warmed up to 28° C. Next, 11.7 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=58.0/42.0 mol % was continuously fed so as to maintain the pressure inside the system at 1.2 MPaG. Also, perfluoro(1,1,5-trihydro-1-pentene) in a total amount of 25.0 g was also continuously fed so as to continue the polymerization. After two hours and after four hours from the start of the polymerization, 7.8 g of an 8% solution of DHP in perfluorohexane was additionally fed. After every 100 minutes therefrom, 1.7 g of the solution was additionally fed. After every two hours from the start of the polymerization, 1.0 g of cyclohexane was additionally fed twice, and after five hours and 40 minutes from the start of the polymerization, 1.0 g thereof was additionally fed. After 9 hours and 57 minutes from the start of the polymerization, the pressure was released to the atmospheric pressure. The reaction product was washed with water and dried, whereby 250 g of a fluororesin powder having an MFR of 30.1 g/10 min was obtained.

Example 3

Except that the amount of cyclohexane initially fed was changed to 1 g, the same procedure as in Example 2 was performed. After seven hours and 32 minutes from the start of the polymerization, the pressure was released to the atmospheric pressure. The reaction product was washed with water and dried, whereby 248 g of a fluororesin powder having an MFR of 6.0 g/10 min was obtained.

Example 4

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of C318, 306 g of TFE, 8.8 g of ethylene, 6.75 g of perfluoro(1,1,5-trihydro-1-pentene), and 2.5 g of cyclohexane. The autoclave was then warmed up to 28° C. Next, 12.1 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=58.0/42.0 mol % was continuously fed so as to maintain the pressure inside the system at 1.2 MPaG. Also, perfluoro(1,1,5-trihydro-1-pentene) in a total amount of 15.8 g was also continuously fed so as to continue the polymerization. After two hours and after four hours from the start of the polymerization, 12.1 g and 6.8 g, respectively, of an 8% solution of DHP in perfluorohexane were additionally fed. After every 100 minutes therefrom, 1.7 g of the solution was additionally fed. After two hours and after four hours from the start of the polymerization, 1.75 g of cyclohexane was additionally fed. After 7 hours and 45 minutes from the start of the polymerization, the pressure was released to the atmospheric pressure. The reaction product was washed with water and dried, whereby 252 g of a fluororesin powder having an MFR of 43.5 g/10 min was obtained.

Example 5

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of C318, 284 g of TFE, 11.2 g of ethylene, 5.82 g of perfluoro(1,1,5-trihydro-1-pentene), and 5.0 g of cyclohexane. The autoclave was then warmed up to 28° C. Next, 7.8 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=56.0/44.0 mol % was continuously fed so as to maintain the pressure inside the system at 1.2 MPaG. Also, perfluoro(1,1,5-trihydro-1-pentene) in a total amount of 12.0 g was also continuously fed so as to continue the polymerization. After every one and a half hours from the start of the polymerization, 7.8 g of an 8% solution of DHP in perfluorohexane was additionally fed three times and 3.9 g thereof was additionally fed three times. After every one and a half hours from the start of the polymerization, 0.5 g of cyclohexane was additionally fed. After 8 hours and 8 minutes from the start of the polymerization, the pressure was released to the atmospheric pressure. The reaction product was washed with water and dried, whereby 254 g of a fluororesin powder having an MFR of 14.0 g/10 min was obtained.

Example 6

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of C318, 318 g of TFE, 7.9 g of ethylene, 6.23 g of perfluoro(1,1,5-trihydro-1-pentene), and 4.5 g of cyclohexane. The autoclave was then warmed up to 28° C. Next, 7.8 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=59.0/41.0 mol % was continuously fed so as to maintain the pressure inside the system at 1.2 MPaG. Also, perfluoro(1,1,5-trihydro-1-pentene) in a total amount of 14.0 g was also continuously fed so as to continue the polymerization. After every one and a half hours from the start of the polymerization, 7.8 g of an 8% solution of DHP in perfluorohexane was additionally fed three times and 3.9 g thereof was additionally fed three times. After every one and a half hours from the start of the polymerization, 0.5 g of cyclohexane was additionally fed. After 6 hours and 36 minutes from the start of the polymerization, the pressure was released to the atmospheric pressure. The reaction product was washed with water and dried, whereby 254 g of a fluororesin powder having an MFR of 15.0 g/10 min was obtained.

Example 7

An autoclave (capacity: 175 L) provided with a stirrer was charged with 52.0 kg of deionized water and the inside of the autoclave was sufficiently purged with nitrogen in vacuo. The autoclave was deaerated in vacuo, and the evacuated autoclave was charged with 37.4 kg of C318, 10.0 kg of tetrafluoroethylene, 0.32 kg of ethylene, 235.2 g of perfluoro (1,1,5-trihydro-1-pentene), and 140 g of cyclohexane. The autoclave was then warmed up to 35° C. Next, 390.6 g of a 30% solution of di-sec-butyl peroxycarbonate (hereinafter, abbreviated as "SBP") in methanol was fed and the polymerization was started. The internal pressure in the autoclave at the start of the polymerization was set to 1.2 MPaG. The pressure inside the system decreased as the polymerization progressed. Thus, a gas mixture of tetrafluoroethylene/ethylene=57.5/42.5 mol % was continuously fed so as to maintain the pressure inside the system at 1.20 MPaG. Also, perfluoro(1,1,5-trihydro-1-pentene) in a total amount of 1.41 kg was also continuously fed so as to continue the polymerization. After four and a half hours and after eight and a half hours from the start of the polymerization, 57.9 g and 53.0 g, respectively, of cyclohexane were fed. After 27 hours from the start of the polymerization, the pressure was released to the atmospheric pressure. The solvent and water where the polymerization progressed were removed. Then, 44.7 kg of deionized water and 1.3 kg of 28% ammonia water were fed and the components were reacted at an in-tank temperature of 80° C. for five hours while the number of stirring rotations was maintained at 150 rpm. The reaction product was cooled down, washed with water, and dried, whereby 22.3 kg of a fluororesin powder having an MFR of 34.7 g/10 min was obtained.

Example 8

An autoclave (capacity: 175 L) provided with a stirrer was charged with 52.0 kg of deionized water and the inside of the autoclave was sufficiently purged with nitrogen in vacuo. The autoclave was deaerated in vacuo, and the evacuated autoclave was charged with 37.4 kg of C318, 12.82 kg of TFE, 0.37 kg of ethylene, 306.6 g of perfluoro(1,1,5-trihydro-1-pentene), and 170.3 g of cyclohexane. The autoclave was then warmed up to 28° C. Next, 515.2 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=57.5/42.5 mol % was continuously fed so as to maintain the pressure inside the system at 1.2 MPaG. Also, perfluoro(1,1,5-trihydro-1-pentene) in a total amount of 1.15 kg was also continuously fed so as to continue the polymerization. After two hours and four hours from the start of the polymerization, 515.2 g and 289.5 g, respectively, of an 8% solution of DHP in perfluorohexane were additionally fed. After every 100 minutes therefrom, 73.7 g of the solution was additionally fed twice. After two hours from the start of the polymerization, 85.2 g of cyclohexane was additionally fed. After 8 hours and 15 minutes from the start of the polymerization, the pressure was released to the atmospheric pressure. The reaction product was washed with water and dried, whereby 18 kg of a fluororesin powder having an MFR of 30.0 g/10 min was obtained.

Comparative Example 1

An autoclave (capacity: 4.11 L) provided with a stirrer was charged with 1215 g of deionized water and the inside of the autoclave was sufficiently purged with nitrogen in vacuo. The autoclave was deaerated in vacuo, and the evacuated autoclave was charged with 878 g of C318, 266 g of TFE, 13.7 g of ethylene, 5.2 g of perfluoro(1,1,5-trihydro-1-pentene), and 7 g of cyclohexane. The autoclave was then warmed up to 28° C. Next, 7.9 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=54.8/45.2 mol % was continuously fed so as to maintain the pressure inside the system at 1.2 MPaG. Also, perfluoro(1,1,5-trihydro-1-pentene) in a total amount of 12.5 g was also continuously fed so as to continue the polymerization. After one and a half hours, after three hours, and after four and a half hours from the start of the polymerization, 7.9 g, 7.8 g, and 3.9 g, respectively, of an 8% solution of DHP in perfluorohexane were additionally fed. After 8 hours and 18 minutes from the start of the polymerization, the pressure was released to the atmospheric pressure. The reaction product was washed with water and dried, whereby 256 g of a fluororesin powder having an MFR of 14.7 g/10 min was obtained.

Comparative Example 2

An autoclave (capacity: 4.11 L) provided with a stirrer was charged with 1214 g of deionized water and the inside of the autoclave was sufficiently purged with nitrogen in vacuo. The autoclave was deaerated in vacuo, and the evacuated autoclave was charged with 878 g of C318, 266 g of TFE, 13.5 g of ethylene, 5.22 g of perfluoro(1,1,5-trihydro-1-pentene), and 8.5 g of cyclohexane. The autoclave was then warmed up to 28° C. Next, 7.86 g of an 8% solution of DHP in perfluorohexane was put into the autoclave and the polymerization was started. The internal pressure in the autoclave at the start of the polymerization was set to 1.2 MPaG. The pressure inside the system decreased as the polymerization progressed. Thus, a gas mixture of TFE/ethylene=54.7/45.3 mol % was continuously fed so as to maintain the pressure inside the system at 1.2 MPaG. Also, perfluoro(1,1,5-trihydro-1-pentene) in a total amount of 12.5 g was also continuously fed so as to continue the polymerization. After one and a half hours and after three hours from the start of the polymerization, 7.9 g and 7.8 g, respectively, of an 8% solution of DHP in perfluorohexane were additionally fed. After every one and half hours therefrom, 3.9 g thereof was additionally fed. After 8 hours and 59 minutes from the start of the polymerization, the pressure was released to the atmospheric pressure. The reaction product was washed with water and dried, whereby 255 g of a fluororesin powder having an MFR of 18.5 g/10 min was obtained.

Comparative Example 3

An autoclave (capacity: 4.11 L) provided with a stirrer was charged with 1280 g of deionized water and the inside of the autoclave was sufficiently purged with nitrogen in vacuo. The autoclave was deaerated in vacuo, and the evacuated autoclave was charged with 891 g of C318, 225 g of TFE, 9.4 g of ethylene, 6.1 g of perfluoro(1,1,5-trihydro-1-pentene), and 4.1 g of cyclohexane. The autoclave was then warmed up to 35° C. Next, 6.98 g of di-n-propyl peroxydicarboante (hereinafter, abbreviated as "NPP") was fed into the autoclave and the polymerization was started. The internal pressure in the autoclave at the start of the polymerization was set to 1.2 MPaG. The pressure inside the system decreased as the polymerization progressed. Thus, a gas mixture of tetrafluoroethylene/ethylene=55.0/45.0 mol % was continuously fed so as to maintain the pressure inside the system at 1.20 MPaG. Also, perfluoro (1,1,5-trihydro-1-pentene) in a total amount of 6.13 g was also continuously fed so as to continue the polymerization. After four hours and 52 minutes from the start of the polymerization, the pressure was released to the atmospheric pressure. The solvent and water where the polymerization progressed were removed. Then, 957.1 g of distilled water and 42.9 g of 28% ammonia were fed and the components were reacted at an in-tank temperature of 80° C. for five hours while the number of stirring rotations was maintained at 30 rpm. The reaction product was cooled down, washed with water, and dried, whereby 125 g of a fluororesin powder having an MFR of 16.0 g/10 min was obtained.

Comparative Example 4

An autoclave (capacity: 1000 L) provided with a stirrer was charged with 416 L of deionized water and the inside of the autoclave was sufficiently purged with nitrogen in vacuo. The autoclave was deaerated in vacuo, and the evacuated autoclave was charged with 287 kg of C318, 76.1 kg of tetrafluoroethylene, 2.4 kg of ethylene, 1.47 kg of (perfluorohexyl)ethylene, and 0.83 kg of cyclohexane. The autoclave was then warmed up to 35° C. Next, 3.1 kg of NPP was fed into the autoclave and the polymerization was started. The internal pressure in the autoclave at the start of the polymerization was set to 1.2 MPaG. The pressure inside the system decreased as the polymerization progressed. Thus, a gas mixture of tetrafluoroethylene/ethylene=57.0/43.0 mol % was continuously fed so as to maintain the pressure inside the system at 1.20 MPaG. Also, (perfluorohexyl)ethylene in a total amount of 19.1 kg was also continuously fed so as to continue the polymerization. After 3.5 hours from the start of the polymerization, 330 g of cyclohexane was fed so as to adjust the MFR. After 11.8 hours from the start of the polymerization, 1.0 kg of cyclohexane was fed. After 22 hours from the start of the polymerization, the pressure was released to the atmospheric pressure. The solvent and water where the polymerization progressed were removed. Then, 400 kg of deionized water and 9 kg of 28% ammonia water were fed and the components were reacted at an in-tank temperature of 80° C. for five hours while the number of stirring rotations was maintained at 30 rpm. The reaction product was cooled down, washed with water, and dried, whereby 250 kg of a fluororesin powder having an MFR of 4.4 g/10 min was obtained.

The resulting fluororesin powder did not satisfy the MIT parameter as shown in Table 2 and had low mechanical properties for its low MFR.

Comparative Example 5

Except that the amount of cyclohexane initially fed was changed to 1.33 kg, the same procedure as in Comparative Example 4 was performed. After 28 hours from the start of the polymerization, the pressure was released to the atmospheric pressure. The reaction product was washed with water and dried, whereby 230 kg of a fluororesin powder having an MFR of 35.1 g/10 min was obtained.

Comparative Example 6

An autoclave (capacity: 175 L) provided with a stirrer was charged with 54.5 kg of deionized water and the inside of the autoclave was sufficiently purged with nitrogen in vacuo. The autoclave was deaerated in vacuo, and the evacuated autoclave was charged with 37.6 kg of C318, 10.3 kg of tetrafluoroethylene, 0.31 kg of ethylene, 164.4 g of perfluoro (1,1,5-trihydro-1-pentene), and 205 g of cyclohexane. The autoclave was then warmed up to 35° C. Next, 299.8 g of SBP was fed and the polymerization was started. The internal pressure in the autoclave at the start of the polymerization was set to 1.2 MPaG. The pressure inside the system decreased as the polymerization progressed. Thus, a gas mixture of tetrafluoroethylene/ethylene=57.5/42.5 mol % was continuously fed so as to maintain the pressure inside the system at 1.20 MPaG. Also, (perfluorohexyl)ethylene in a total amount of 1.02 kg was also continuously fed so as to continue the polymerization. After 15 hours from the start of the polymerization, the pressure was released to the atmospheric pressure. The solvent and water where the polymerization progressed were removed. Then, 44.7 kg of deionized water and 1.3 kg of 28% ammonia water were fed and the components were reacted at an in-tank temperature of 80° C. for five hours while the number of stirring rotations was maintained at 150 rpm. The reaction product was cooled down, washed with water, and dried, whereby 22.3 kg of a fluororesin powder having an MFR of 39.0 g/10 min was obtained.

TABLE 1

|  | Example 1 | Example 2 | Example 3 | Example 4 | Example 5 | Example 6 |
|---|---|---|---|---|---|---|
| TFE/Et | 57.3/42.7 | 57.8/42.2 | 57.8/42.2 | 58.1/41.9 | 56.3/43.7 | 59.0/41.0 |
| Polymerization initiator | DHP | DHP | DHP | DHP | DHP | DHP |
| Amount of third component (mol %) | 2.5 | 2.5 | 2.5 | 2.2 | 2.2 | 2.0 |
| Mh (g/10 min) | 26.8 | 90.4 | 13.1 | 71.6 | 44 | 47 |
| Mf (g/10 min) | 45.7 | 30.1 | 6.0 | 43.5 | 14 | 15 |
| Melting point (DSC 2nd) | 243.0 | 241.3 | 241.6 | 241.7 | 253 | 241 |
| 1% Decomposition temperature (° C.) | 389.4 | 390.4 | 390.9 | 390.2 | 375 | 391 |
| Amount of polymer obtained (g) | 252 | 250 | 248 | 252 | 254 | 254 |
| 320° C. tanδ(60)/tanδ(5) | 117 | 150 | 131 | 140 | 96 | 185 |
| 330° C. YI (visual observation) | Good | Good | Good | Good | Good | Good |
| YI before heating | −50 | −48 | −60 | −51 | −62 | −60 |
| ΔYI (ASTM-1925) | 61 | 63 | 72 | 63 | 69 | 66 |
| Weight loss by heating at 330° C. | 0.16 | 0.26 | 0.12 | 0.09 | 0.61 | 0.09 |
| β | 0.64 | 0.64 | 0.65 | 0.61 | 0.65 | 0.68 |
| MIT (cycles) | 24000 | 36000 | 82000 | 25000 | 57000 | 57000 |
| MIT (parameter) | Good | Good | Good | Good | Good | Good |
| (Number of ethylene unit-ethylene unit bonds)/(total number of ethylene units each independently present between $CF_2$ groups) | 0.048 | 0.045 | 0.045 | 0.042 | 0.026 | 0.038 |

TABLE 2

|  | Comparative Example 1 | Comparative Example 2 | Comparative Example 3 | Comparative Example 4 |
|---|---|---|---|---|
| TFE/Et | 54.8/45.2 | 54.7/45.3 | 55.0/45.0 | 57.0/43.0 |
| Polymerization initiator | DHP | DHP | NPP | NPP |
| Amount of third component (mol %) | 1.7 | 1.8 | 1.8 | 1.4 |
| Mh (g/10 min) | 163 | 192 | 182 | 34.0 |
| Mf (g/10 min) | 14.7 | 18.5 | 16.0 | 4.4 |
| Melting point (DSC 2nd) | 266.7 | 265.4 | 264.3 | 252 |
| 1% Decomposition temperature (° C.) | 368.3 | 367.6 | 362.8 | 368 |
| Amount of polymer obtained | 256 g | 255 g | 125 g | 250 kg |
| 320° C. tanδ(60)/tanδ(5) | 44 | 25 | 60 | 118 |
| 330° C. YI (visual observation) | Poor | Poor | Poor | Poor |
| YI before heating | −68 | −74 | −48 | −46 |
| ΔYI (ASTM-1925) | 116 | 128 | 132 | 126 |
| Weight loss by heating at 330° C. | 0.72 | 0.7 | 1.74 | 1.28 |
| β | 0.77 | 0.99 | 0.74 | 0.51 |
| MIT (cycles) | 20000 | 16000 | 15000 | 52000 |
| MIT (parameter) | Poor | Poor | Poor | Poor |
| (Number of ethylene unit-ethylene unit bonds)/(total number of ethylene units each independently present between $CF_2$ groups) | 0.028 | 0.028 | 0.038 | 0.042 |

TABLE 3

|  | Example 7 | Example 8 | Comparative Example 5 | Comparative Example 6 |
|---|---|---|---|---|
| TFE/Et | 57.5/42.5 | 57.4/42.6 | 57.0/43.0 | 57.4/42.6 |
| Polymerization initiator | SBP | DHP | NPP | SBP |
| Amount of third component (mol %) | 2.3 | 2.4 | 1.4 | 1.6 |
| Mh (g/10 min) | 60 | 60 | 140.0 | 442 |
| Mf (g/10 min) | 34.7 | 30 | 35.1 | 39.0 |
| Melting point (DSC 2nd) | 245 | 245 | 253 | 251 |
| 1% Decomposition temperature (° C.) | 376 | 387 | 367 | 363 |
| Amount of polymer obtained | 22.3 kg | 18 kg | 230 kg | 22.3 kg |
| 320° C. tanδ(60)/tanδ(5) | 92 | 120 | 102 | 86 |
| β | 0.66 | 0.65 | 0.52 | 0.56 |
| MIT (cycles) | 32000 | 35000 | 9000 | 12000 |
| MIT (parameter) | Good | Good | Poor | Poor |
| (Number of ethylene unit-ethylene unit bonds)/(total number of ethylene units each independently present between $CF_2$ groups) | 0.052 | 0.048 | 0.043 | 0.038 |

Using a φ32-mm twin screw extruder (available from JSW, Ltd.) including a vent mechanism provided with a pressure reducer, 20 kg of each of the ETFE powders obtained in Examples 7 and 8 and Comparative Examples 5 and 6 was pelletized under conditions shown in Table 4.

TABLE 4

| Pelletizing conditions | | | | | | | | | | | | | |
|---|---|---|---|---|---|---|---|---|---|---|---|---|---|
| Cylinder temperatures | | | | | | | | | | screw rotation | Degree of vent pressure | Pellet drying conditions | |
| C1 (° C.) | C2 (° C.) | C3 (° C.) | C4 (° C.) | C5 (° C.) | C6 (° C.) | C7 (° C.) | C8 (° C.) | Die holder (° C.) | Die (° C.) | speed (rpm) | reduction (kPa) | Temperature (° C.) | Time (h) |
| 235 | 271 | 271 | 271 | 271 | 271 | 271 | 271 | 288 | 266 | 450 | 66.5 | 190 | 6 |

Using the pellets obtained by the above method, the ETFE was applied through a φ20 extruder to cover a 200-μm core (copper wire) such that the coating layer had a thickness of 100 μm. The coated electric wire was subjected to evaluation of tensile elongation and tensile strength at break before and after heat aging (evaluation of thermal crack resistance) in conformity with UL1581. The evaluation of foreign substances in electric wire coating was performed by the aforementioned method. The results are shown in Table 5.

TABLE 5

|  | Example 7 | Example 8 | Comparative Example 5 | Comparative Example 6 |
|---|---|---|---|---|
| Evaluation of thermal crack resistance | Good | Good | Poor | Poor |
| Evaluation of foreign substances in electric wire coating | Good | Good | Acceptable | Poor |

The above results demonstrate that Examples 7 and 8 satisfied the 200° C. heat-resistant test on ETFE in conformity with UL1581, while Comparative Examples 5 and 6 failed to satisfy the test.

Examples 7 and 8 were evaluated as Good because foreign substances were hardly generated, while in Comparative Examples 5 and 6 many foreign substances were generated.

INDUSTRIAL APPLICABILITY

The ETFE of the invention can reduce generation of foreign substances during molding, and thus can be applied to a variety of molded articles. The ETFE of the invention can be used for electric wire coats used in electric devices such as robots, electric motors, power generators, and transformers, electric wire coats used in communication devices such as telephones, radio sets, computers, and data communication devices, and electric wire coats used in train vehicles, automobiles, aircraft, and ships. The ETFE of the invention can be used for applications requiring heat resistance, and is particularly suitable for electric wire coats used in the electric devices such as robots, electric motors, power generators, and transformers.

The invention claimed is:

1. An ethylene/tetrafluoroethylene copolymer that satisfies the following formula (1), comprising a polymerized unit (a) based on ethylene, a polymerized unit (b) based on tetrafluoroethylene, and a polymerized unit (c) based on a monomer copolymerizable with ethylene and tetrafluoroethylene, the polymerized unit (a) based on ethylene and the polymerized unit (b) based on tetrafluoroethylene giving a mol % ratio (a)/(b) of (44 to 41)/(56 to 59), the polymerized unit (c) being present in an amount of 1.8 mol % or more of all structural units, the polymerized unit (c) is a polymerized unit based on a monomer represented by the following formula (A2):

$$CH_2=CX-(CF_2)_nZ \quad (A2)$$

wherein X and Z are the same as or different from each other and are each a hydrogen atom or a fluorine atom; and n is an integer of 2 to 8, $$75 \leq \tan \delta(60)/\tan \delta(5) \times 100 \leq 225 \quad (1)$$

wherein tan δ(5): a loss tangent after five minutes from start of measurement in dynamic mechanical analysis in an air atmosphere at 320° C.

tan δ(60): a loss tangent after 60 minutes from the start of measurement in the dynamic mechanical analysis in the air atmosphere at 320° C.

2. The ethylene/tetrafluoroethylene copolymer according to claim 1,
wherein the mol % ratio (a)/(b) of the polymerized unit (a) based on ethylene and the polymerized unit (b) based on tetrafluoroethylene is (43.5 to 41.5)/(56.5 to 58.5).

3. The ethylene/tetrafluoroethylene copolymer according to claim 1,
wherein the ethylene/tetrafluoroethylene copolymer has a melt flow rate of 0.1 to 60.0 g/10 min at 297° C.

4. The ethylene/tetrafluoroethylene copolymer according to claim 1,
wherein the ethylene/tetrafluoroethylene copolymer has a melt flow rate of 4.0 to 45.0 g/10 min at 297° C.

5. A molded article obtainable by molding the ethylene/tetrafluoroethylene copolymer according to claim 1.

6. The molded article according to claim 5, wherein the molded article is a film or a sheet.

7. An electric wire comprising
a core; and
a coat formed from the ethylene/tetrafluoroethylene copolymer according to claim 1.

8. An ethylene/tetrafluoroethylene copolymer that satisfies the following formula (1), comprising a polymerized unit (a) based on ethylene, a polymerized unit (b) based on tetrafluoroethylene, and a polymerized unit (c) based on a monomer copolymerizable with ethylene and tetrafluoroethylene,
the polymerized unit (a) based on ethylene and the polymerized unit (b) based on tetrafluoroethylene giving a mol % ratio (a)/(b) of (44 to 41)/(56 to 59), the polymerized unit (c) being present in an amount of 1.8 mol % or more of all structural units the polymerized unit (c) is a polymerized unit based on a monomer represented by the following formula (A2):

$$CH_2=CX—(CF_2)_nZ \quad (A2)$$

wherein X and Z are the same as or different from each other and are each a hydrogen atom or a fluorine atom; and n is an integer of 2 to 8, $$75 \leq \tan \delta(60)/\tan \delta(5) \times 100 \leq 225 \quad (1)$$

wherein tan δ(5): a loss tangent after five minutes from start of measurement in dynamic mechanical analysis in an air atmosphere at 320° C.

tan δ(60): a loss tangent after 60 minutes from the start of measurement in the dynamic mechanical analysis in the air atmosphere at 320° C., wherein in elemental analysis of the copolymer achieved by $^1$H-NMR analysis, the ethylene/tetrafluoroethylene copolymer satisfies the following formula (3):

(number of ethylene unit-ethylene unit bonds)/(total number of ethylene units each independently present between $CF_2$ groups)≤0.060 (3).

9. The ethylene/tetrafluoroethylene copolymer according to claim 8,
wherein the mol % ratio (a)/(b) of the polymerized unit (a) based on ethylene and the polymerized unit (b) based on tetrafluoroethylene is (43.5 to 41.5)/(56.5 to 58.5).

10. The ethylene/tetrafluoroethylene copolymer according to claim 8,
wherein the ethylene/tetrafluoroethylene copolymer has a melt flow rate of 0.1 to 60.0 g/10 min at 297° C.

11. The ethylene/tetrafluoroethylene copolymer according to claim 8,
wherein the ethylene/tetrafluoroethylene copolymer has a melt flow rate of 4.0 to 45.0 g/10 min at 297° C.

12. A molded article obtainable by molding the ethylene/tetrafluoroethylene copolymer according to claim 8.

13. The molded article according to claim 12, wherein the molded article is a film or a sheet.

14. An electric wire comprising
a core; and
a coat formed from the ethylene/tetrafluoroethylene copolymer according to claim 8.

* * * * *